(12) United States Patent
Newcomb et al.

(10) Patent No.: US 10,913,417 B2
(45) Date of Patent: Feb. 9, 2021

(54) COMPOSITE ENERGY ABSORBING STRUCTURE FOR A VEHICLE

(71) Applicant: GM Global Technology Operations LLC, Detroit, MI (US)

(72) Inventors: Bradley A. Newcomb, Troy, MI (US); Robert N. Saje, Shelby Township, MI (US); Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 16/409,270

(22) Filed: May 10, 2019

(65) Prior Publication Data

US 2020/0353984 A1  Nov. 12, 2020

(51) Int. Cl.
*B60R 19/34* (2006.01)

(52) U.S. Cl.
CPC .................... *B60R 19/34* (2013.01)

(58) Field of Classification Search
CPC ....................................................... B60R 19/34
USPC .......................................................... 293/133
See application file for complete search history.

(56) References Cited

U.S. PATENT DOCUMENTS

| 6,588,830 B1* | 7/2003 | Schmidt | B60R 19/34 |
| | | | 180/311 |
| 6,705,653 B2* | 3/2004 | Gotanda | B60R 19/34 |
| | | | 293/132 |
| 8,596,711 B2* | 12/2013 | Yasui | B62D 25/082 |
| | | | 296/187.09 |
| 2016/0121931 A1* | 5/2016 | Tamaoki | B62D 21/02 |
| | | | 296/187.09 |
| 2016/0318552 A1* | 11/2016 | Matsumoto | B62D 25/082 |
| 2017/0328435 A1* | 11/2017 | Kamiya | B32B 5/26 |

* cited by examiner

*Primary Examiner* — Dennis H Pedder
(74) *Attorney, Agent, or Firm* — Quinn IP Law

(57) ABSTRACT

An energy absorbing structure for a vehicle includes a body having an outer periphery defined by one or more outer walls. An inner periphery of the body is defined by and extends between the one or more outer walls. A first end and a second end of the body are defined by the one or more outer walls. A transverse plate is disposed within and extending at least partially through the inner periphery of the body to provide structural support to the body, wherein the transverse plate cooperates with and extends between the first wall and the opposing second wall. The transverse plate divides the inner periphery into a first compartment defined between the third wall and the transverse plate and a second compartment defined between the fourth wall and the transverse plate.

19 Claims, 3 Drawing Sheets

COMPOSITE ENERGY ABSORBING STRUCTURE FOR A VEHICLE

INTRODUCTION

The present disclosure relates generally to composite, energy-absorbing assemblies, and more specifically to fiber-reinforced composite energy absorbing members and structures.

It is advantageous to improve energy management performance of vehicle components. However, it is also advantageous that components of automobiles or other vehicles be light weight to improve fuel efficiency. Thus, vehicle components that exhibit adequate strength during both normal service and under extraordinary conditions such as contact events, while minimizing component weight are advantageous.

SUMMARY

Disclosed herein is an energy absorbing structure for a vehicle that includes a body having an outer periphery defined by one or more outer walls. The one or more walls may include a first wall, a second wall opposite the first wall, a third wall extending between the first wall and the second wall, and a fourth wall opposite to the third wall extending between the first wall and the second wall.

An inner periphery of the body is defined by and extends between the one or more outer walls. A first end of the body is defined by the one or more outer walls while a second end of the body is defined by the one or more outer walls and disposed opposite the first end.

A transverse plate is disposed within and extending at least partially through the inner periphery of the body to provide structural support to the body, wherein the transverse plate cooperates with and extends between the first wall and the opposing second wall. The transverse plate divides the inner periphery into a first compartment defined between the third wall and the transverse plate and a second compartment defined between the fourth wall and the transverse plate.

An energy absorbing structure for a vehicle includes a body having an outer periphery defined by one or more outer walls. An inner periphery of the body is defined by and extends between the one or more outer walls. A first end and a second end of the body are defined by the one or more outer walls. A transverse plate is disposed within and extending at least partially through the inner periphery of the body to provide structural support to the body, wherein the transverse plate cooperates with and extends between the first wall and the opposing second wall. The transverse plate divides the inner periphery into a first compartment defined between the third wall and the transverse plate and a second compartment defined between the fourth wall and the transverse plate.

The body and transverse plate of the energy absorbing structure may be constructed from fiber-reinforced composite materials and may be constructed as a unitary structure. The first end and the second end of the body include an opening formed therein, wherein the opening in the first end and the opening in the second end cooperates with the inner periphery of the body. The transverse plate extends at least partially through the inner periphery of the body from the opening in the first end to a region of the inner periphery proximate the opening in the second end of the body to reduce cross-sectional area of the body and reduces transfer of energy absorbing force.

The second wall may include a first portion extending generally parallel to the first wall between a surface of the first end and a junction and a second portion extending at an oblique angle from the junction of the first portion to a surface of the second end of the body. The second portion of the second wall is non-planar with the first portion of the second wall and the first wall and cooperates with the transverse plate to reduce cross-sectional area of the body and reduces transfer of energy absorbing force.

Each of the first wall and the second wall increases from a thickness of about 1.8 mm at the second end of the body to a thickness of about 6.0 mm at the first end of the body. The inner periphery of each of the third wall and the fourth wall increases from a thickness of about 1.8 mm at the second wall of the body to a thickness of about 6.0 mm at the first wall of the body. The transverse plate increases from a thickness of about 1.8 mm at the second end of the body to a thickness of about 6.0 mm at the first end of the body.

The above features and advantages and other features and advantages of the present disclosure are readily apparent from the following detailed description of the best modes for carrying out the disclosure when taken in connection with the accompanying drawings.

Figure 1:
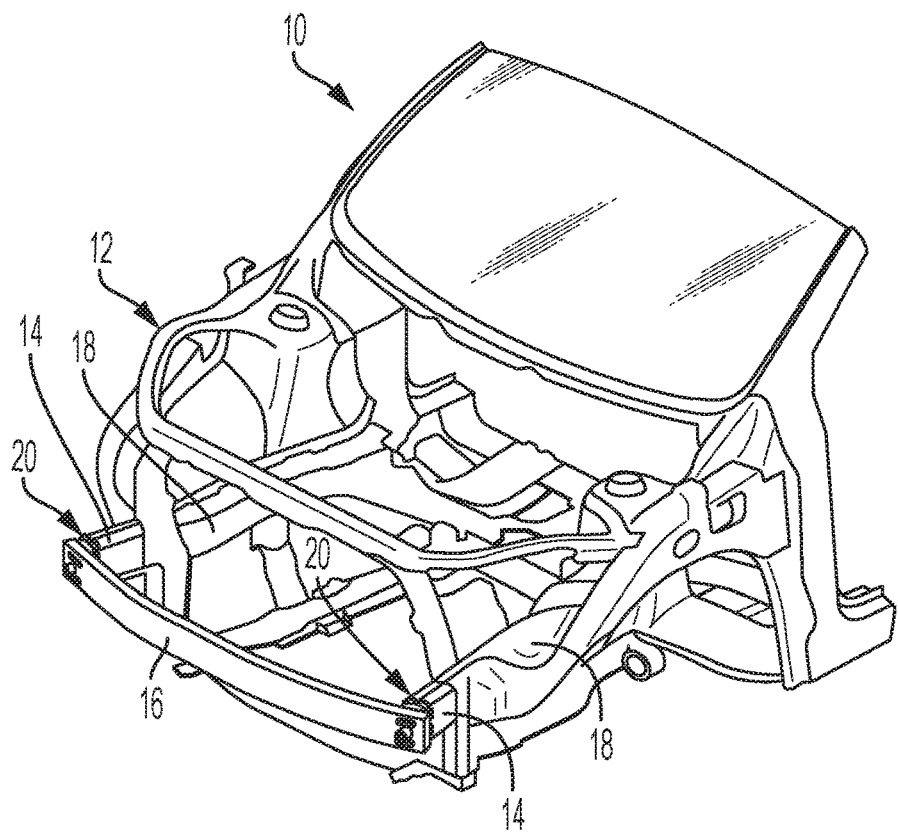
FIG. 1 is a fragmentary perspective view of a vehicle having a body structure including a bumper and energy absorbing assembly including a bumper beam attached to at least one energy absorbing member in accordance with one or more embodiments of the disclosure.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Referring to the drawings, wherein like reference numbers refer to like components throughout the views, FIG. 1 shows a portion of an example vehicle 10. The vehicle 10 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other transportation device.

While the vehicle 10 of FIG. 1 is a typical example application suitable for the bumper and energy absorbing assembly, generally referenced by 20 and disclosed herein, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the bumper and energy absorbing assembly 20 to such an embodiment.

Referring now to FIG. 1, the vehicle 10 has a body structure 12. The body structure 12 cooperates with the bumper and energy absorbing assembly 20. The bumper and energy absorbing assembly 20 may include at least one energy absorbing member 14 and a bumper beam 16. The at least one energy absorbing member 14 and the bumper beam 16 may be located at a front end of the body structure 12 of the vehicle 10, as shown. Alternatively, the at least one energy absorbing member 14 and the bumper beam 16 of the bumper and energy absorbing assembly 20 may be located at a rear end of the body structure 12 of the vehicle 10.

The body structure 12 may include one or more rails 18. The at least one energy absorbing member 14 may be attached to the rail 18. Alternatively, the at least one energy absorbing member 14 may be a portion of the rail 18 adjacent to the bumper beam 16. The bumper beam 16 may be configured to receive the external force and to distribute the external force to one or more energy absorbing members 14. The at least one energy absorbing member 14 may be configured to absorb energy when the vehicle 10 is subjected to an external force (not shown).

As shown in FIG. 1, the at least one energy absorbing member 14 may include a pair of energy absorbing members 14 disposed adjacent opposing side rails 18 of the body structure 12 that cooperate with opposing ends of the bumper beam 16 to secure the bumper beam 16 to the body structure 12. A first end 40 of the at least one energy absorbing member 14 cooperates with the one or more rails 18 while a second end 42 of the at least one energy absorbing member 14 cooperates with the bumper beam 16. For purposes of clarity, the terms at least one energy absorbing member 14 and energy absorbing member 14 will be used interchangeably in the following portions of the specification. Use of the terms at least one energy absorbing member 14 and energy absorbing member 14 do not provide any limitations to this specification.

Figure 2:
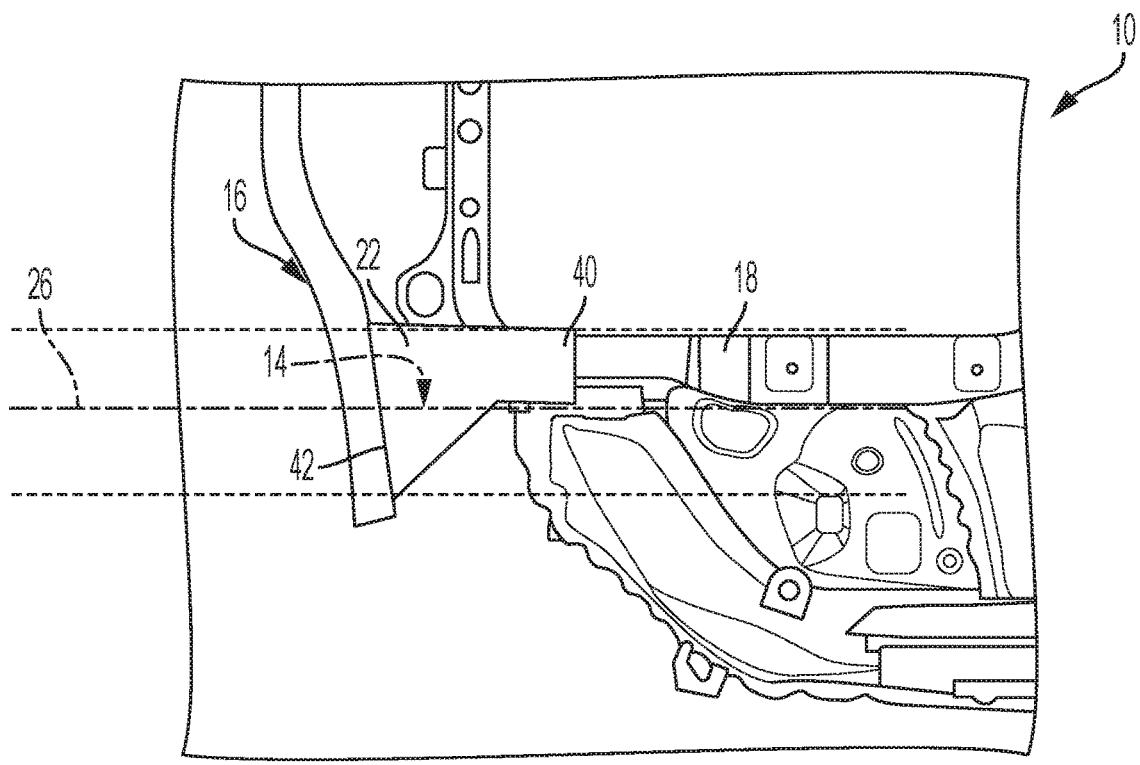
FIG. 2 is a top plan elevation view of the body structure including the bumper and energy absorbing assembly in accordance with one or more embodiments of the disclosure.
Figure 3:
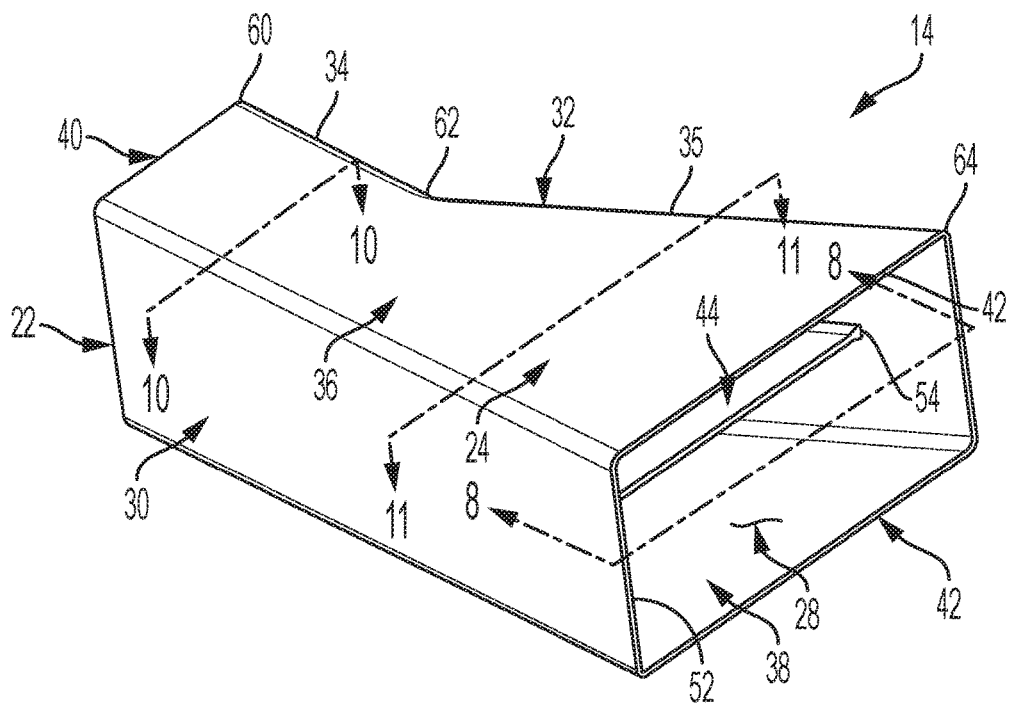
FIG. 3 is a perspective view of an exemplary energy absorbing member for the bumper and energy absorbing assembly in accordance with one or more embodiments of the disclosure.

The energy-absorbing structures or energy absorbing members 14 are used in a vehicle 10 to absorb energy through controlled deformation. The at least one energy absorbing member 14 may include energy absorbing members, such as energy absorbing cans or boxes, attached to a bumper beam 16. Referring additionally to FIGS. 2 and 3, energy absorbing member 14 may include a body 22 having an outer periphery, generally referenced by numeral 24, defined by one or more outer walls. As shown in FIG. 2, the body 22 extends along a longitudinal axis 26. An inner periphery of the body 22, referenced by numeral 28, is defined by and extends between the one or more outer walls 24.

Referring back to FIG. 3, the inner periphery 28 of the body may extend at least partially through the body 22 defined by the outer peripheral walls 24 and generally define a hollow interior of the body. The inner periphery 28 of the body may extend through the body 22 between a first end 40 shown in FIG. 4 and a second end 42 of the body 22 shown in FIG. 5. The energy absorbing member 14 may also include one or more internal plates, generally referenced by numeral 44, which provide structural geometry for reinforcement of the energy absorbing member 14. The amount of energy absorbed by the energy absorbing member 14 is a function of the material and the geometry of the energy absorbing member 14 under energy absorbing load.

The energy absorbing member 14 may be constructed from fiber-reinforced composite or metal, such as aluminum or steel. Fiber-reinforced composite materials include a polymeric matrix having a reinforcing material distributed therein. Suitable reinforcing materials include, but are not limited to, non-crimp fabric ("NCF") carbon or glass fibers, glass fiber, carbon fiber, aramid fiber, basalt fiber, fiber made from natural products (e.g., hemp, jute, or other bast fibers), high strength polymeric fibers (e.g., high strength polyethylene or high strength polypropylene). The reinforcing materials may be fabricated as woven fabric, continuous random fabric, discontinuous random fibers, chopped random fabric, continuous strand unidirectional plies, oriented chopped strand plies, braided fabric and any combinations thereof. The polymeric matrix may be a thermoplastic polymer or a thermoset polymer. Representative composite materials may include, but are not limited to, continuous carbon fiber thermoplastics, discontinuous carbon fiber thermoplastics, discontinuous fiber thermoset prepreg materials or continuous fiber thermoset prepreg materials.

Energy absorbing members 14 are designed to absorb energy in an event. Metal energy absorbing members absorb energy as molecules slide past one another to deform the component without fracturing. Fiber-reinforced composite energy absorbing members absorb energy through fragmentation, pulverization, fronding, tearing, interlaminar, intralaminar, fiber-matrix debonding, and fiber pullout failure modes, by way of non-limiting example. However, energy absorbing members 14 can potentially detach from the bumper beam 16 in an event, particularly when the energy-absorbing structure is contacted at an angle that is non-parallel to the longitudinal axis of the energy absorbing member 14.

However, in the case of a composite energy absorbing member 14, the energy absorbing member 14 is integrated with the one or more rails 18 and body structure 12 of the vehicle. Thus, while the bumper 16 may separate from the energy absorbing member 14, the integrated energy absorbing member 14 will remain in the path of contact to absorb a maximum amount of energy possible during a contact event based on the material and geometry of the energy absorbing member 14. Fiber-reinforced composite energy absorbing members 14 are lighter in weight than metal energy absorbing members 14. Such lighter weight energy absorbing members 14 may improve vehicle fuel efficiency.

Referring now to FIG. 3, one or more exemplary embodiments of the at least one energy absorbing member 14 is described in greater detail. It is appreciated that the at least one energy absorbing member may be formed in a variety of geometries and configurations to accomplish the objectives of the disclosure. The body 22 of the energy absorbing member 14 includes a first sidewall or first wall 30 and an opposing second sidewall or second wall 32. In one-non limiting example, the first wall 30 of the energy absorbing member body may extend a length between about 100 mm and about 600 mm with a height of between about 50 mm and about 250 mm.

A top wall or third wall 36 of the energy absorbing member 14 extends between the first wall 30 and the second wall 32, while a bottom wall or fourth wall 38 provided on an opposing side from the third wall 36 extends between the first wall 30 and the sidewall 32. The opposing first and second walls 30, 32 as shown in FIG. 3, in combination with the opposing third and fourth walls 36, 38 extending between the first and second walls 30, 32, cooperate to define the one or more outer or peripheral walls 24 of the body 22 of the energy absorbing member 14 and the inner periphery 28 of the energy absorbing member 14. Additionally, one or more outer peripheral walls 24 of the body cooperate to define a first end 40 and an opposing second end 42.

As shown in FIGS. 2 and 3, the first end 40 of the body 22 of the energy absorbing member 14 is positioned adjacent to and cooperates with the one or more rails 18 of the body structure 12 of the vehicle 10. Further, the second end 42 of the body of energy absorbing member 14 is positioned adjacent to and cooperates with the bumper beam 16. The first end 40 and second end 42 are disposed on opposing portions or sides of the body 22 of the energy absorbing member 14. It is understood that the walls 30, 32, 36, 38 of the body 22, as well as first end 40 and second end 42 of the body 22, are illustrated in a generally parallel arrangement in the Figures, the objectives of this disclosure are satisfied if the one or more of the walls 30, 32, 36, 38 and/or the first end 40 and second end 42 of the body 22 are not generally parallel to each other.

Figure 4:
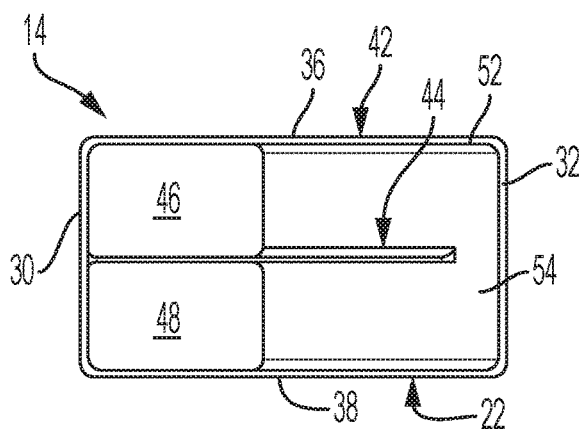
FIG. 4 is a front plan view of the exemplary energy absorbing member for the bumper and energy absorbing assembly in accordance with one or more embodiments of the disclosure.
Figure 5:
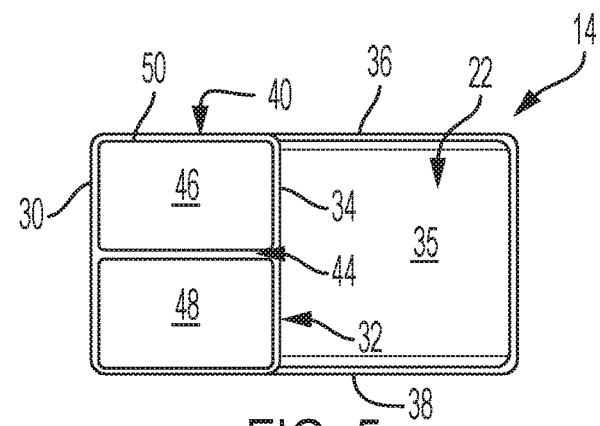
FIG. 5 is a rear plan view of the exemplary energy absorbing member for the bumper and energy absorbing assembly in accordance with one or more embodiments of the disclosure.

In one non-limiting example, as shown in FIGS. 4 and 5, each of the first end 40 and second end 42 include an opening 44 formed therein that cooperates with the inner periphery 28 of the energy absorbing member 14. The first end 40 may have a width of about 50 mm to about 200 mm and a height of between about 50 mm and about 250 mm. The second end 42 may have a width of about 120 mm to about 240 mm and a height of between about 50 mm and about 250 mm.

Each of the first wall 30, second wall 32, third wall 36 and fourth wall 38 of the energy absorbing member 14 may be formed as a single-piece compression molded structure from a composite having a polymer matrix and a plurality of reinforcing fibers (not shown). Alternatively, the energy absorbing member may be formed of a multiple piece structure that is bonded or joined together following the formation of the components of the energy absorbing member 14. At least some of the reinforcing fibers may continuously extend between the first wall 30 and the second wall 32, while at least some of the reinforcing fibers may continuously extend between the third wall 36 and the fourth wall 38.

The energy absorbing member 14 may further include a transverse plate 44 disposed within and extending at least partially through the inner periphery 28 of the body 22 of the energy absorbing member 14. The transverse plate 44 may provide structural support to the body 22 by increasing structural stiffness of the energy absorbing member 14, thereby improving energy absorbing performance. The transverse plate 44 may extend between and cooperate with the opposing first and second walls 30, 32 of the body 22 such that it divides the inner periphery 28 into a first compartment 46 defined between the third wall 36 and the transverse plate 44 and a second compartment 48 defined between the fourth wall 38 and the transverse plate 44. It is contemplated that the first and second compartments 46, 48 may be of substantially equal volume.

One or more of the first wall 30, second wall 32, third wall 36, fourth wall 38 and the transverse plate 44 may be formed from the composite materials including continuous carbon fiber thermoplastics, discontinuous carbon fiber thermoplastics, discontinuous fiber thermoset prepreg materials or continuous fiber thermoset prepreg materials. Alternatively, one or more of the first wall 30, second wall 32, third wall 36, fourth wall 38 and the transverse plate 44 may be formed from a metal or metallic material. In yet another embodiment, one or more of the first wall 30, second wall 32, third wall 36, fourth wall 38 and the transverse plate 44 may be formed from a mix of materials, such as the use of thermoplastic materials with thermoset materials, thermoplastic materials with metallic materials, thermoset materials with metallic materials, and the like.

Figure 6:
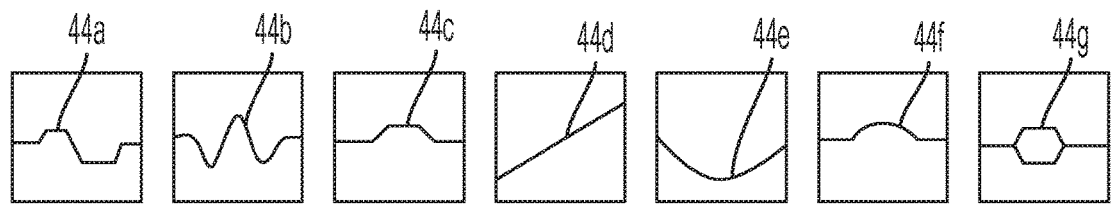
FIG. 6 provides plan view illustrations of exemplary interior configurations of the energy absorbing member for the bumper and energy absorbing assembly in accordance with one or more embodiments of the disclosure.

The transverse plate 44 illustrated in FIGS. 3-5 may have a substantially planar shape and be disposed parallel to a longitudinal axis 26 of the energy absorbing member 14. It is also understood, as is illustrated in FIG. 6, that alternative shapes or geometries for the transverse plate, generally referenced by numbers 44a, 44b, 44c, 44d, 44e, 44f and 44g, may be utilized to accomplish the objectives of this disclosure. The alternative geometries 44a-44g, may be adopted for a variety of purposes, such as to provide additional structural support to the energy absorbing member body, reduction of energy absorbing member weight and/or reduction of materials required to manufacture the unitary energy absorbing member body. In one or more embodiments of the disclosure, the transverse plate 44 may be formed as part of the unitary structure of the energy absorbing member 14 utilizing the same fiber-reinforced composite materials as the energy absorbing member body 22.

As is shown in FIGS. 3-5, the transverse plate 44 may extend at least partially through the inner periphery 28 of the energy absorbing member body 22 from an opening 50 in the first end 40 to a region 54 proximate the opening 52 in the second end 42 of the energy absorbing member body 22. Limiting the extension of the transverse plate 44 through the inner periphery 28 of the energy absorbing member body 22 reduces the cross-sectional area of the energy absorbing member 14 and thereby, reduces the energy absorbing force transferred to the vehicle 10.

Figure 7:
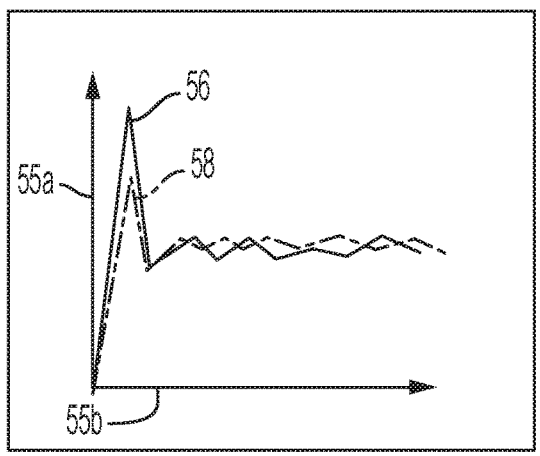
FIG. 7 is a chart illustrating physical properties of the energy absorbing member based upon energy absorbing force and energy absorbing length in response to axial contact in accordance with one or more embodiments of the disclosure.

Referring to FIG. 7, the differences in axial contact plotted as a factor of energy absorbing force 55a and energy absorbing length 55b with a partially extending transverse plate and fully extending transverse plate are illustrated. Reference line and numeral 56 represents an energy absorbing member including a transverse plate extending the entire length of the inner periphery of the energy absorbing member body between the first end and the second end. Reference line and numeral 58 represents an energy absorbing member including a transverse plate extending a partial length of the inner periphery of the energy absorbing member body as shown in FIG. 3 between the first end and an area proximate the opening in the second end. The partial length transverse plate reduces the energy absorbing initiation force at the instant of an event, thereby reducing resultant g-forces acting on occupants of a vehicle.

Referring back to FIG. 3, in one or more embodiments of the disclosures, the second sidewall or second wall 32 may be formed with multiple geometries. Second wall 32 may include a first portion 34 extending generally parallel to and planar with the first wall 30. The first portion 34 extends between a surface 60 of the first end 40 to a junction 62. A second portion 35 of the second wall 32 extends at an oblique angle from the junction 62 of the first portion 34 to a surface 64 on the second end 42 of the body 22. The second portion is non-planar with the first portion 34 of the second wall 32 or the first wall 30. The top wall or third wall 36 and bottom wall or fourth wall 38 extend with the second portion 35 and define the inner periphery 28 of the body 22 therebetween.

Further, the transverse plate 44 may extend along the inner periphery of the second portion 35 of the second wall 30 to the region 54 proximate the opening 52 in the second end 42 of the energy absorbing member body 22. In one non-limiting example of the disclosure, the combination of the oblique geometry of the second portion 35 of the second wall, in combination with the positioning the transverse plate 44 through the inner periphery 28 of the energy absorbing member body 22 reduces the cross-sectional area of the energy absorbing member 14 and the energy absorbing force transferred to the vehicle 10.

Figure 8:
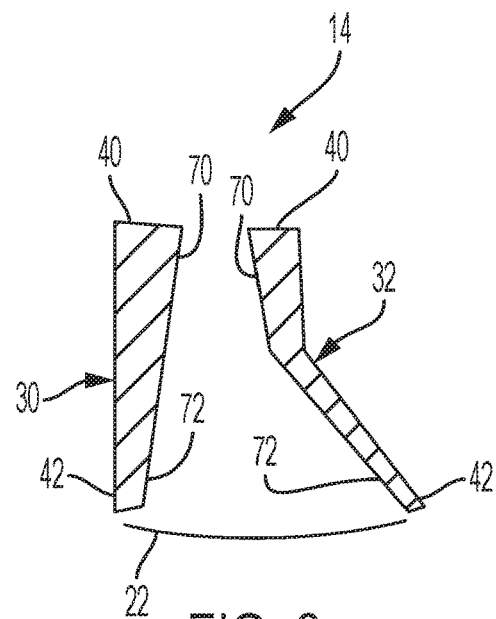
FIG. 8 is a cross sectional view of the energy absorbing member along line 8-8 of FIG. 3 in accordance with one or more embodiments of the disclosure.

Referring now to FIG. 8, the first wall 30 and the second wall 32 of at least one energy absorbing member 14 are shown along section line 8-8 of FIG. 3. The first wall 30 and second wall 32 are formed with an increasing wall thickness as the first and second walls 30, 32 extend from the second end 42 to the first end 40 of the energy absorbing member body 22. Edge portions 70 of the first and second walls 30, 32 adjacent the first end 40 of the body 22 have a greater wall thickness than the edge portions 72 of the first and second walls adjacent the second end 42 of the body 22.

The thickness increase from the bumper side or second end 42 to the body side or first end 40 of the body 22 provides stiffness to the energy absorbing member body 22 and ensures that the deformation of the energy absorbing member 14 initiates at the bumper side or second end 42 and not at the body side or first end 40.

In one non-limiting example, thickness can be constant along the length of the energy absorbing member in a range of about 1.8 mm to about 6.0 mm, with a preferred range of about 2.0 mm to about 4.0 mm. The thickness increase along the length of the energy absorbing member body 22 also improves the energy absorbing force vs energy absorbing length profile for the energy absorbing member in response to an axial contact as illustrated in FIG. 9, improving total energy absorption of the energy absorbing member 14 as compared to an energy absorbing member 14 with first and second walls 30, 32 of constant wall thickness.

Figure 9:
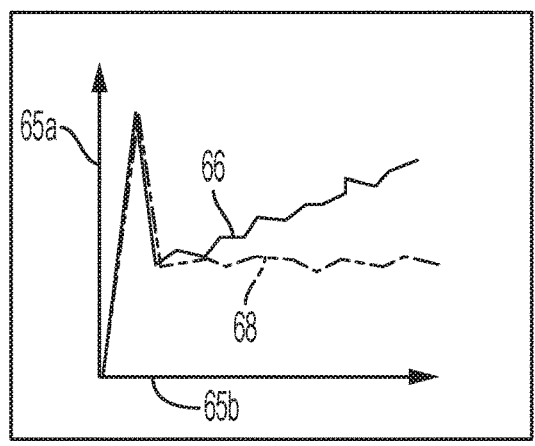
FIG. 9 is a chart illustrating physical properties of the energy absorbing member based upon energy absorbing force and energy absorbing length in response to a 30-degree angular contact in accordance with one or more embodiments of the disclosure.

FIG. 9 illustrates the differences in an axial contact plotted as a factor of energy absorbing force 65a and energy absorbing length 65b. The increase of structural stiffness improves total energy absorption of the energy absorbing member 14 and the structural stiffness of the energy absorbing member body 22 as represented by reference lines 66 for increased thickness of the walls 30, 32, 36, 38 and 68 representing constant thickness of the walls 30, 32, 36, 38.

Figure 10:
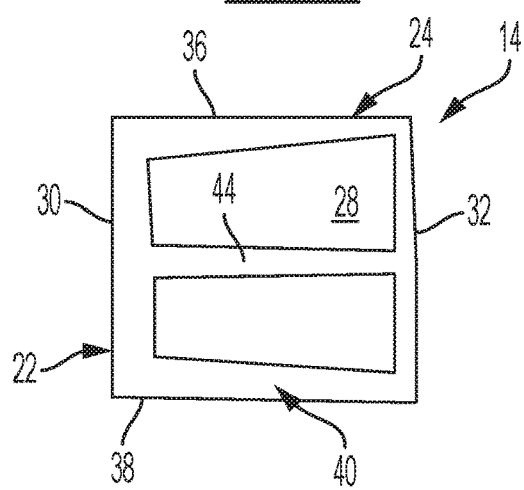
FIG. 10 is a front plan elevation view of the energy absorbing member along line 10-10 of FIG. 3 in accordance with one or more embodiments of the disclosure.
Figure 11:
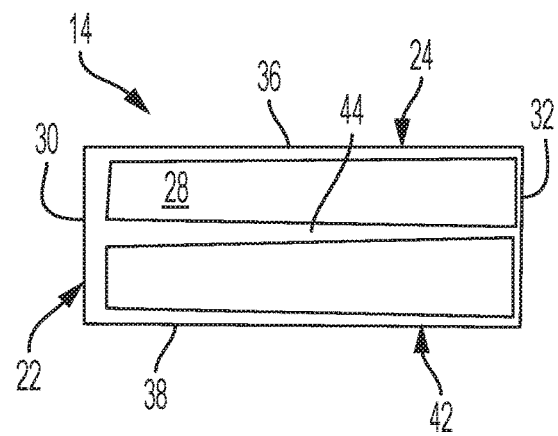
FIG. 11 is a front plan elevation view of the energy absorbing member along line 11-11 of FIG. 3 in accordance with one or more embodiments of the disclosure.

Referring now to FIGS. 10 and 11, the outer periphery 24 and inner periphery 28 of the energy absorbing member 14 are illustrated along section line 10-10 of FIG. 3. As shown in FIG. 10, the third wall 36 and fourth wall 38 are each formed with an increasing wall thickness as the third and fourth walls 36, 38 extend from the second wall 32 to the first wall 30 of the energy absorbing member body 22 adjacent the first end 40 of the energy absorbing member 14. Similarly, as shown in FIG. 11 along second line 11-11 of FIG. 3, the third wall 36 and fourth wall 38 are each formed with an increasing wall thickness as the third and fourth walls 36, 38 extend from the second wall 32 to the first wall 30 of the energy absorbing member body 22 adjacent the second end 42 of the energy absorbing member 14.

In one or more embodiments of the disclosure, the third wall 36 and fourth wall 38 of the outer periphery 24 of the energy absorbing member body 22 may remain generally parallel and planar to each other or may be tapered relative to each other while the inner periphery 28 of the third wall 36 and fourth wall 38 are tapered to allow for the increased thickness. The thickness increase in the cross-car direction from the second wall 32 to the first wall 30 improves the energy absorbing force vs energy absorbing length profile for the energy absorbing member.

In one non-limiting example, thickness can be constant along the width of the energy absorbing member 14 between the first wall 30 and the second wall 32 in a range of about 1.8 mm to about 6.0 mm, with a preferred range of about 2.0 mm to about 4.0 mm. The thickness increase along the width of the energy absorbing member body 22 also improves the energy absorbing force vs energy absorbing length profile for the energy absorbing member in response to a 30 degree angular contact as illustrated in FIG. 11, improving total energy absorption of the energy absorbing member 14 as compared to an energy absorbing member 14 with third and fourth walls 36, 38 of constant wall thickness.

The thickness of the transverse plate 44 may be constant or may increase in wall thickness similar to the third and fourth walls 36, 38 as the transverse plate 44 extends from the second wall 32 to the first wall 30 of the energy absorbing member body 22. Alternatively, the thickness of the transverse plate 44 may be constant or may increase in wall thickness similar to the first and second walls 30, 32 as the transverse plate 44 extends from the second end 42 to the first end 40 of the energy absorbing member body 22.

In one non limiting example, the thickness of the transverse plate 44 may be a constant thickness of about 1.8 mm. In another non-limiting example, the thickness of the transverse plate may vary between a thickness of between about 1.8 mm and about 3.0 mm at the second end 42 or second wall 32 of the body 22 to a thickness of between about 1.8 mm and about 6.0 mm at the first end 40 or the first wall 30. In yet another non-limiting example, the thickness of the transverse plate may vary between a thickness of between about 1.8 mm and about 3.0 mm at the first end 40 or first wall 30 of the body 22 to a thickness of between about 1.8 mm and about 6.0 mm at the second end 42 or the second wall 32.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An energy absorbing structure for a vehicle comprising:
    a body having an outer periphery defined by one or more outer walls, the one or more outer walls including:
    a first wall,
    a second wall opposite the first wall, wherein the second wall includes:
        a first portion extending generally parallel to the first wall between a surface of the first end and a junction; and
        a second portion extending at an oblique angle from the junction of the first portion to a surface of the second end of the body,
        wherein the second portion of the second wall is non-planar with the first portion of the second wall and the first wall and cooperates with the transverse plate to increase cross-sectional area of the body and reduces transfer of energy absorbing force,
    a third wall extending between the first wall and the second wall, and
    a fourth wall opposite the third wall extending between the first wall and the second wall;
    an inner periphery of the body defined by and extending between the one or more outer walls;
    a first end of the body defined by the one or more outer walls;
    a second end of the body defined by the one or more outer walls and disposed opposite the first end; and
    a transverse plate disposed within and extending at least partially through the inner periphery of the body to provide structural support to the body, wherein the transverse plate cooperates with and extends between the first wall and the opposing second wall,
    wherein the transverse plate divides the inner periphery into a first compartment defined between the third wall and the transverse plate and a second compartment defined between the fourth wall and the transverse plate.

2. The energy absorbing structure of claim 1 wherein the body and transverse plate are constructed from fiber-reinforced composite materials.

3. The energy absorbing structure of claim 1 wherein the body and transverse plate are constructed from fiber-reinforced composite materials as a unitary structure.

4. The energy absorbing structure of claim 1 wherein the first end and the second end of the body include an opening formed therein, wherein the opening in the first end and the opening in the second end cooperates with the inner periphery of the body.

5. The energy absorbing structure of claim 4 wherein the transverse plate extends at least partially through the inner periphery of the body from the opening in the first end to a region of the inner periphery proximate the opening in the second end of the body to reduce cross-sectional area of the body, thereby reducing transfer of energy absorbing force.

6. The energy absorbing structure of claim 1 wherein the first wall and the second wall increase from a thickness of about 1.8 mm at the second end of the body to a thickness of about 6.0 mm at the first end of the body.

7. The energy absorbing structure of claim 1 wherein the inner periphery of the third wall and the fourth wall increase from a thickness of about 1.8 mm at the second wall of the body to a thickness of about 6.0 mm at the first wall of the body.

8. The energy absorbing structure of claim 1 wherein the transverse plate increases from a thickness of about 1.8 mm at the second wall of the body to a thickness of about 6.0 mm at the first wall of the body.

9. An energy absorbing structure for a vehicle comprising:
    a body having an outer periphery defined by one or more outer walls, the one or more outer walls including a first wall, a second wall opposite the first wall, a third wall extending between the first wall and the second wall, and a fourth wall opposite the third wall extending between the first wall and the second wall, wherein the second wall includes:
        a first portion extending generally parallel to the first wall between a surface of the first end and a junction; and
        a second portion extending at an oblique angle from the junction of the first portion to a surface of the second end of the body, wherein the second portion of the second wall is non-planar with the first portion of the second wall and the first wall;
    an inner periphery of the body defined by and extending between the one or more outer walls;
    a first end of the body defined by the one or more outer walls including an opening cooperating with the inner periphery of the body;
    a second end of the body defined by the one or more outer walls and disposed opposite the first end, wherein the second end includes an opening cooperating with the inner periphery of the body; and
    a transverse plate disposed within and extending at least partially through the inner periphery of the body to provide structural support to the body, wherein the transverse plate cooperates with and extends between the first wall and the opposing second wall,
    wherein the transverse plate divides the inner periphery into a first compartment defined between the third wall and the transverse plate and a second compartment defined between the fourth wall and the transverse plate.

10. The energy absorbing structure of claim 9 wherein the body and transverse plate are constructed from fiber-reinforced composite materials as a unitary structure.

11. The energy absorbing structure of claim 9 wherein the transverse plate extends at least partially through the inner periphery of the body from the opening in the first end to a region of the inner periphery proximate the opening in the second end of the body to increase cross-sectional area of the body and reduces transfer of energy absorbing force.

12. The energy absorbing structure of claim 9 wherein the first wall and the second wall increase from a thickness of about 1.8 mm at the second end of the body to a thickness of about 6.0 mm at the first end of the body.

13. The energy absorbing structure of claim 9 wherein the inner periphery of the third wall and the fourth wall increase from a thickness of about 1.8 mm at the second wall of the body to a thickness of about 6.0 mm at the first wall of the body.

14. The energy absorbing structure of claim 9 wherein the transverse plate increases from a thickness of about 1.8 mm at the second wall of the body to a thickness of about 6.0 mm at the first wall of the body.

15. A vehicle comprising:
   a body structure including one or more rails;
      an energy absorbing structure, the energy absorbing structure including:
   a body having an outer periphery defined by one or more outer walls, the one or more outer walls including a first wall, a second wall opposite the first wall, a third wall extending between the first wall and the second wall, and a fourth wall opposite to the third wall extending between the first wall and the second wall, wherein the second wall includes:
   a first portion extending generally parallel to the first wall between a surface of a first end and a junction, and
   a second portion extending at an oblique angle from the junction of the first portion to a surface of a second end of the body, wherein the second portion of the second wall is non-planar with the first portion of the second wall and the first wall,
   an inner periphery of the body defined by and extending between the one or more outer walls,
   a first end of the body defined by the one or more outer walls including an opening cooperating with the inner periphery of the body, wherein the first end of the body cooperates with the one or more rails of the body structure,
   a second end of the body defined by the one or more outer walls and disposed opposite the first end, wherein the second end includes an opening cooperating with the inner periphery of the body, and
   a transverse plate disposed within and extending at least partially through the inner periphery of the body to provide structural support to the body, wherein the transverse plate cooperates with and extends between the first wall and the opposing second wall; and
   a bumper beam, wherein the second end of the body cooperates with the bumper beam.

16. The vehicle of claim 15 wherein the transverse plate extends at least partially through the inner periphery of the body from the opening in the first end to a region of the inner periphery proximate the opening in the second end of the body to increase cross-sectional area of the body and reduces transfer of energy absorbing force.

17. The vehicle of claim 15 wherein the first wall and the second wall increase from a thickness of about 1.8 mm at the second end of the body to a thickness of about 6.0 mm at the first end of the body.

18. The vehicle of claim 15 wherein the inner periphery of the third wall and the fourth wall increase from a thickness of about 1.8 mm at the second wall of the body to a thickness of about 6.0 mm at the first wall of the body.

19. The vehicle of claim 15 wherein the transverse plate increases from a thickness of about 1.8 mm at the second wall of the body to a thickness of about 6.0 mm at the first wall of the body.

* * * * *